US012795461B2

(12) United States Patent
Kim et al.

(10) Patent No.: US 12,795,461 B2
(45) Date of Patent: Nov. 10, 2026

(54) METHOD AND DEVICE FOR SUPPORTING THE CONTINUITY OF BROADCAST SERVICE IN WIRELESS COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 629 days.

(21) Appl. No.: 17/913,647

(22) PCT Filed: Mar. 23, 2021

(86) PCT No.: PCT/KR2021/003573
§ 371 (c)(1),
(2) Date: Sep. 22, 2022

(87) PCT Pub. No.: WO2021/194219
PCT Pub. Date: Sep. 30, 2021

(65) Prior Publication Data

US 2023/0124420 A1 Apr. 20, 2023

(30) Foreign Application Priority Data

Mar. 23, 2020 (KR) ........................ 10-2020-0035087

(51) Int. Cl.
*H04W 36/00* (2009.01)
*H04W 84/04* (2009.01)

(52) U.S. Cl.
CPC .................. *H04W 36/0016* (2013.01); *H04W 36/0007* (2018.08); *H04W 84/042* (2013.01)

(58) Field of Classification Search
CPC ......... H04W 36/0016; H04W 36/0007; H04W 84/042; H04W 36/0011; H04W 36/0058; H04W 36/08; H04W 36/18
See application file for complete search history.

(56) References Cited

U.S. PATENT DOCUMENTS

| | | | | |
|---|---|---|---|---|
| 10,932,095 B2 * | 2/2021 | Dao | H04W 4/06 | |
| 2012/0236776 A1 * | 9/2012 | Zhang | H04W 48/20 | 370/312 |
| 2014/0029580 A1 * | 1/2014 | Jung | H04W 36/0066 | 370/331 |

(Continued)

FOREIGN PATENT DOCUMENTS

| | | |
|---|---|---|
| CN | 101568158 A | 10/2009 |
| EP | 2 697 914 B1 | 10/2017 |

(Continued)

OTHER PUBLICATIONS

Korean Office Action with English Translation date Jun. 22, 2026; Korean Appln. No. 10-2020-0035087.*

(Continued)

*Primary Examiner* — Jay P Patel
*Assistant Examiner* — Shehab A Alawdi
(74) *Attorney, Agent, or Firm* — Jefferson IP Law, LLP

(57) ABSTRACT

An operating method of a user equipment (UE) in a wireless communication system according to an embodiment of the present disclosure may include: receiving, from a first base station (BS), a radio resource control (RRC) message including multicast and broadcast service (MBS) configuration information; receiving an MBS from the first BS, based on the MBS configuration information; receiving, from the first BS, a handover command received from a second BS, based on information about the MBS; performing a handover to the second BS, based on the handover (Continued)

command; and receiving the MBS from the second BS, wherein the MBS is transmitted from the first BS until the handover is successful.

8 Claims, 11 Drawing Sheets

(56) References Cited

U.S. PATENT DOCUMENTS

| | | | | |
|---|---|---|---|---|
| 2016/0007321 | A1 | 1/2016 | Zhang et al. | |
| 2016/0087904 | A1 | 3/2016 | Chun et al. | |
| 2018/0027528 | A1 | 1/2018 | Hong et al. | |
| 2018/0124650 | A1* | 5/2018 | Park | H04W 36/0055 |
| 2018/0139665 | A1* | 5/2018 | Park | H04W 36/0061 |
| 2018/0160342 | A1* | 6/2018 | Park | H04W 36/0033 |
| 2018/0242206 | A1* | 8/2018 | Kim | H04W 36/0055 |
| 2018/0359614 | A1 | 12/2018 | Yu et al. | |
| 2021/0258918 | A1* | 8/2021 | Hong | H04W 36/0007 |

FOREIGN PATENT DOCUMENTS

| | | | |
|---|---|---|---|
| WO | 2016/111522 | A1 | 7/2016 |
| WO | 2017/082660 | A1 | 5/2017 |
| WO | 2019/160342 | A1 | 8/2019 |

OTHER PUBLICATIONS

European Summons to attend oral proceedings dated Jul. 3, 2026; European Appln. No. 21 775 826.7-1206.*

Extended European Search Report dated Jul. 31, 2023, issued in European Patent Application No. 21775826.7.

Ericsson: Contents of Handover Request, 3GPP Draft; R2-1707277, XP051301765, Jun. 26, 2017.

Anis Muhammad Moiz et al.: Overview of evolved Multimedia Broad-cast Multicast Services (eMBMS), Mar. 21, 2016, pp. 1-50, XP093065027.

ETSI MCC; Draft Report of 3GPP TSG RAN WG2 meeting #91bis, Malmö, Sweden, Oct. 5-10, 2015; 3GPP TSG-RAN Working Group 2 meeting #92; R2-15xxxx; Anaheim, USA; Nov. 16-20, 2015.

Korean Office Action with English translation dated Aug. 8, 2025; Korean Appln. No. 10-2020-0035087.

Chinese Office Action with English translation dated Oct. 24, 2025; Chinese Appln. No. 202180024182.4.

International Search Report dated Jun. 23, 2021, issued in International Application No. PCT/KR2021/003573.

European Office Action dated Apr. 24, 2024, issued in European Patent Application No. 21775826.7.

Korean Office Action with English translation dated Jun. 22, 2026; Korean Appln. No. 10-2020-0035087.

* cited by examiner

METHOD AND DEVICE FOR SUPPORTING THE CONTINUITY OF BROADCAST SERVICE IN WIRELESS COMMUNICATION SYSTEM

TECHNICAL FIELD

The present disclosure relates to a method and apparatus for supporting continuity of a broadcast service in a wireless communication system.

BACKGROUND ART

In order to meet increasing demand with respect wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. A 5G communication system defined in the $3^{rd}$ Generation Partnership Project (3GPP) is called a New Radio (NR) system. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system. In order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (COMP), and received-interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

Because various services can be provided due to the aforementioned development of mobile communication systems, there is a demand for a method for efficiently providing the services, and in particular, there is a demand for a method for seamlessly supporting a broadcast or multicast service.

DESCRIPTION OF EMBODIMENTS

Technical Problem

Disclosed embodiments provide a method and apparatus for supporting continuity of a broadcast service in a wireless communication system.

Solution to Problem

According to an embodiment of the present disclosure, an operating method of a user equipment (UE) in a wireless communication system may include: receiving, from a first base station (BS), a radio resource control (RRC) message including multicast and broadcast service (MBS) configuration information; receiving an MBS from the first BS, based on the MBS configuration information; receiving, from the first BS, a handover command received from a second BS, based on information about the MBS; performing a handover to the second BS, based on the handover command; and receiving the MBS from the second BS, wherein the MBS is transmitted from the first BS until the handover is successful.

The information about the MBS may include information about a temporary mobile group identity (TMGI) list corresponding to the MBS.

The handover command may include at least one of MBS data radio bearer (DRB) information of the second BS, MBS radio link control (RLC) bearer configuration information, or a group-radio network temporary identity (G-RNTI) corresponding to a TMGI included in the TMGI list.

The operating method may further include monitoring a G-RNTI from the first BS until the handover is completed based on the handover command, and monitoring a cell-RNTI (C-RNTI) from the second BS.

According to an embodiment of the disclosure, an operating method of a first base station (BS) in a wireless communication system may include: transmitting, to a user equipment (UE), a radio resource control (RRC) message including multicast and broadcast service (MBS) configuration information; transmitting an MBS to the UE, based on the MBS configuration information; transmitting information about the MBS to a second BS, based on measurement information of a channel on which the MBS is transmitted; and transmitting, to the UE, a handover command received from the second BS, based on the information about the MBS, wherein the UE performs a handover to the second BS, based on the handover command, and wherein the MBS is transmitted from the first BS until the handover is successful.

The information about the MBS may include information about a temporary mobile group identity (TMGI) list corresponding to the MBS.

The handover command may include at least one of information about an indicator corresponding to an MBS data radio bearer (DRB) of the second BS, MBS radio link control (RLC) bearer configuration information, or a group-radio network temporary identity (G-RNTI) corresponding to a TMGI included in the TMGI list.

The operating method may further include delivering, to a higher layer, data stored in a point to point (PTP) bearer for which the indicator is configured.

According to an embodiment of the disclosure, a user equipment (UE) in a wireless communication system may include: a transceiver; and at least one processor coupled with the transceiver, wherein the at least one processor is configured to receive, from a first base station (BS), a radio resource control (RRC) message including multicast and broadcast service (MBS) configuration information, receive an MBS from the first BS, based on the MBS configuration information, receive, from the first BS, a handover command received from a second BS, based on information about the MBS, and perform a handover to the second BS, based on the handover command, wherein the MBS is transmitted from the first BS until the handover is successful.

According to an embodiment of the present disclosure, a first base station (BS) in a wireless communication system may include: a transceiver; and at least one processor coupled with the transceiver, wherein the at least one processor is configured to transmit, to a user equipment (UE), a radio resource control (RRC) message including multicast and broadcast service (MBS) configuration information, transmit an MBS to the UE, based on the MBS configuration information, transmit information about the MBS to a second BS, based on measurement information of a channel on which the MBS is transmitted, and transmit, to the UE, a handover command received from the second BS, based on the information about the MBS, wherein the UE performs a handover to the second BS, based on the handover command, and wherein the MBS is transmitted from the first BS until the handover is successful.

Advantageous Effects of Disclosure

According to disclosed embodiments, a service can be effectively provided in a mobile communication system.

MODE OF DISCLOSURE

Figure 1A:
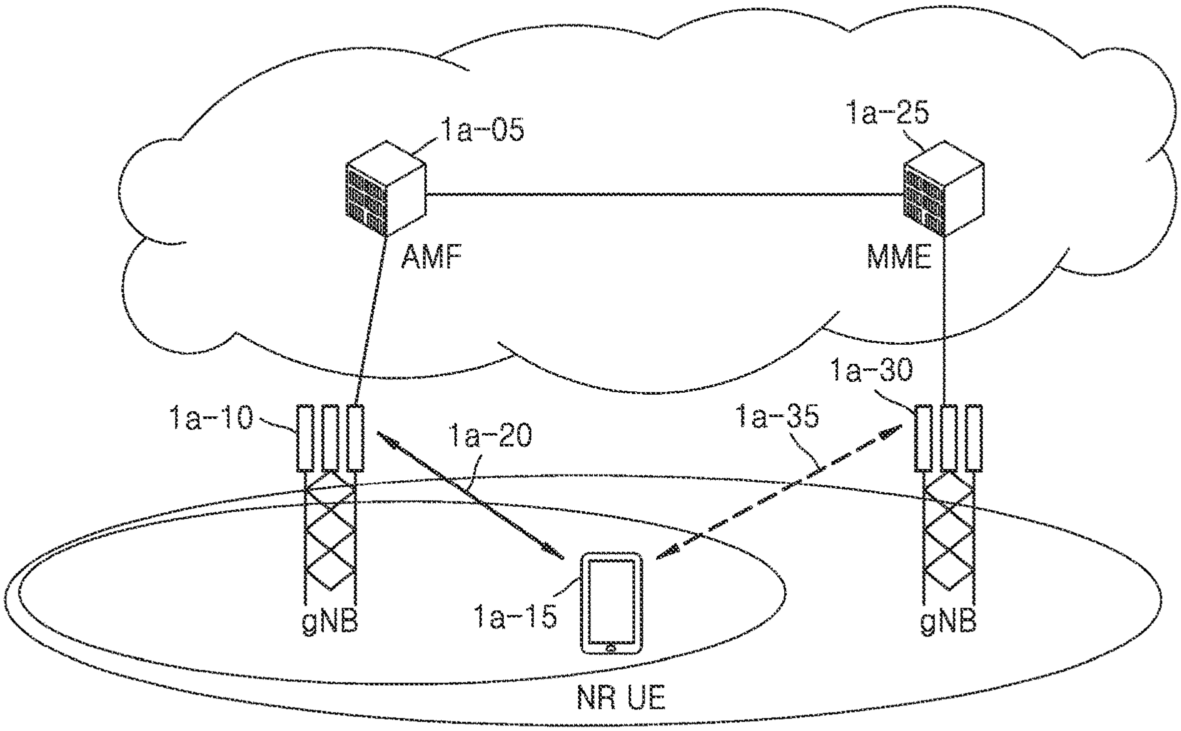
FIG. 1A is a diagram illustrating architecture of a next-generation mobile communication system according to an embodiment of the present disclosure.

In the following descriptions of the present disclosure, well-known functions or configurations are not described in detail because they would obscure the present disclosure with unnecessary details. Hereinafter, embodiments of the present disclosure will be described in detail with reference to accompanying drawings.

Advantages and features of the present disclosure and methods of accomplishing the same may be understood more readily by reference to the following detailed descriptions of embodiments and accompanying drawings of the present disclosure. The present disclosure may, however, be embodied in many different forms and should not be construed as being limited to the embodiments set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit" as used in the present embodiment refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, according to an embodiment, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the elements and " . . . units" may be combined into fewer elements and " . . . units" or further separated into additional elements and " . . . units". Further, the elements and " . . . units" may be implemented to operate one or more central processing units (CPUs) in a device or a secure multimedia card. Also, in embodiments, a " . . . unit" may include one or more processors.

In the description of the present disclosure, detailed descriptions of the related art are omitted when it is deemed that they may unnecessarily obscure the essence of the present disclosure. Hereinafter, embodiments of the present disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the present disclosure is not limited to terms to be described below, and other terms indicating objects having equal technical meanings may be used.

For convenience of descriptions, the present disclosure uses terms and names defined in the 3$^{rd}$ Generation Partnership Project (3GPP) long term evolution (LTE) standards. However, the present disclosure is not limited to these terms and names, and may be equally applied to communication systems conforming to other standards. In the present disclosure, an evolved node B (eNB) may be interchangeably used with a next-generation node B (gNB) for convenience of descriptions. That is, a base station described by an eNB may represent a gNB. Also, the term "terminals (user equipments)" may refer to not only mobile phones, NB-IoT devices, and sensors but also refer to other wireless communication devices.

The present disclosure is presented based on the LTE system but may be applied to other mobile communication systems such as NR and the like which are next-generation mobile communication systems. For example, in the present disclosure, an eNB in the LTE may correspond to a gNB in the NR, and a mobility management entity (MME) in the LTE may correspond to an access and mobility management function (AMF) in the NR.

Hereinafter, a base station is an entity that allocates resources to a terminal, and may be at least one of a next-generation node B (gNode B), an evolved node B (eNode B), a Node B, a base station (BS), a radio access unit, a BS controller, or a node on a network. A terminal may include a user equipment (UE), a mobile station (MS), a cellular phone, a smartphone, a computer, or a multimedia system capable of performing a communication function. However, the present disclosure is not limited to the above example.

In particular, the present disclosure may be applied to 3GPP NR (5th generation mobile communication standards). The present disclosure is applicable to intelligent services (e.g., smart home, smart building, smart city, smart car or connected car, health care, digital education, retail, security, and safety services) based on 5G communication technology and Internet of things (IoT) technology. In the disclosure, an eNB may be interchangeably used with a gNB for convenience of description. That is, a BS described by an eNB may represent a gNB. Also, the term "terminals (UEs)" may refer to not only mobile phones, NB-IoT devices, and sensors but also other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-Advanced (LTE-A), and LTE-Pro of the 3GPP, high rate packet data (HRPD) and ultra mobile broadband (UMB) of 3GPP2, 802.16e of the Institute of Electrical and Electronic Engineers (IEEE), or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link for transmitting data or a control signal from a UE or an MS to an eNode B or a BS, and the DL refers to a radio link for transmitting data or a control signal from the BS to the UE. The multiple access schemes identify data or control information of different users in a manner that time-frequency resources for carrying the data or control information of the users are allocated and managed not to overlap each other, that is, to achieve orthogonality therebetween.

As a post-LTE communication system, i.e., the 5G communication system is requested to freely reflect various requirements from users and service providers, and thus, has to support services that simultaneously satisfies the various requirements. The services being considered for the 5G communication system include enhanced mobile broadband (eMBB), massive machine-type communication (mMTC), ultra-reliability low-latency communication (URLLC) services, or the like.

The eMBB may aim to provide an improved data rate than a data rate supported by the legacy LTE, LTE-A, or LTE-Pro. For example, in the 5G communication system, the eMBB should be able to provide a peak data rate of 20 Gbps in a DL and a peak data rate of 10 Gbps in an UL at one BS. Also, the 5G communication system shall simultaneously provide the peak data rate and an increased user-perceived data rate of a UE. In order to satisfy such requirements, there is a need for the 5G communication system to have an improvement in transmission/reception technology including an improved multiple-input multiple-output (MIMO) transmission technology. Also, a data rate required in the 5G communication system may be satisfied by using a frequency bandwidth wider than 20 MHz in the 3 GHz to 6 GHz or 6 GHz or more frequency band, instead of current LTE transmitting a signal by using maximum 20 MHz in the 2 GHz band.

Also, the mMTC is being considered to support application services such as IoT in the 5G communication system. In order to efficiently provide the IoT, the mMTC may require the support for a large number of terminals in a cell, improved coverage for a terminal, improved battery time, reduced costs of a terminal, and the like. Because the IoT is attached to various sensors and various devices to provide a communication function, the mMTC should be able to support a large number of terminals (e.g., 1,000,000 terminals/km$^2$) in a cell. Also, because a terminal supporting the mMTC is likely to be located in a shadow region failing to be covered by the cell, such as the basement of a building, due to the characteristics of the service, the terminal may require wider coverage than other services provided by the 5G communication system. The terminal supporting the mMTC should be configured as a low-cost terminal and may require a very long battery life time of 10 to 15 years because it is difficult to frequently replace the battery of the terminal.

Lastly, the URLLC refers to cellular-based wireless communication services used for mission-critical purposes, and for example, services for remote control of robots or machinery, industrial automation, unmanned aerial vehicles, remote health care, emergency alerts, and the like may be considered. Therefore, the URLLC should provide communications providing very low latency (ultra-low latency) and very high reliability (ultra-high reliability). For example, a service supporting the URLLC should satisfy air interface latency of less than 0.5 milliseconds, and may simultaneously have a requirement for a packet error rate of 10-5 or less. Thus, for the service supporting the URLLC, the 5G system should provide a transmit time interval (TTI) smaller than other services and may simultaneously have a design requirement for allocating wide resources in a frequency band so as to ensure reliability of a communication link.

The three services considered for the 5G communication system, i.e., the eMBB, the URLLC, and the mMTC, may be multiplexed and transmitted in one system. Here, in order to satisfy different requirements of the services, the services may use different transceiving schemes and different transceiving parameters. While the mMTC, the URLLC, and the eMBB may be examples of different service types, service types to which the present disclosure is applied are not limited to the examples.

Although LTE, LTE-A, LTE Pro or 5G (or NR, next-generation mobile communication) system is mentioned as an example in the following description, embodiments of the present disclosure may also be applied to other communication systems having similar technical backgrounds or channel types. Also, embodiments of the present disclosure are applicable to other communication systems through modification at the discretion of one of ordinary skill in the art without greatly departing from the scope of the present disclosure.

The present disclosure relates to a mobile communication system, and more particularly, provides a UE, a BS, and operating methods thereof for supporting continuity of a broadcast service in the mobile communication system.

FIG. 1A is a diagram illustrating architecture of a next-generation mobile communication system according to an embodiment of the present disclosure.

Referring to FIG. 1A, a radio access network of the next-generation mobile communication system (e.g., a new radio (NR) system) includes a next-generation BS (e.g., a new radio node B, hereinafter, gNB) 1*a*-10 and a new radio core network (AMF) 1*a*-05. A new radio user equipment (hereinafter, NR UE or terminal) 1*a*-15 may access an external network via the gNB 1*a*-10 and the AMF 1*a*-05.

In FIG. 1A, the gNB 1*a*-10 corresponds to an evolved node B (eNB) 1*a*-30 of a legacy LTE system. The gNB 1*a*-10 may be connected to the NR UE 1*a*-15 via a radio channel 1*a*-20 and may provide superior services compared to the legacy node B 1*a*-30. In the next-generation mobile communication system, all user traffic data may be serviced via shared channels, and therefore, an entity for performing scheduling by collating, for example, buffer state information of UEs 1*a*-15, available transmit power state information, and channel state information may be required and the gNB 1*a*-10 may operate as such an entity. In general, one gNB 1*a*-10 may control a plurality of cells. The next-generation mobile communication system may have a bandwidth greater than the maximum bandwidth of the legacy LTE system so as to achieve an ultrahigh data rate, and may additionally associate a beamforming technology with orthogonal frequency division multiplexing (OFDM) as a radio access technology. Also, the next-generation mobile communication system may use an adaptive modulation & coding (AMC) scheme to determine a modulation scheme and a channel coding rate in accordance with a channel state of a UE. The AMF 1*a*-05 performs functions such as mobility support, bearer establishment, quality of service (QoS) configuration, and the like. The AMF 1*a*-05 is an entity for performing a mobility management function and various control functions on the UE 1*a*-15 and may be connected to a plurality of BSs. Also, the next-generation mobile communication system may cooperate with the legacy LTE system, and the AMF 1*a*-05 may be connected to a mobility management entity (MME) 1*a*-25 via a network interface. The MME 1*a*-25 is connected to the eNB 1*a*-30 that is a legacy BS. The UE 1*a*-15 that supports LTE-NR Dual Connectivity (EN-DC) may transceive data while maintaining connection not only to the gNB 1*a*-10 but also to the eNB 1*a*-30.

Figure 1B:
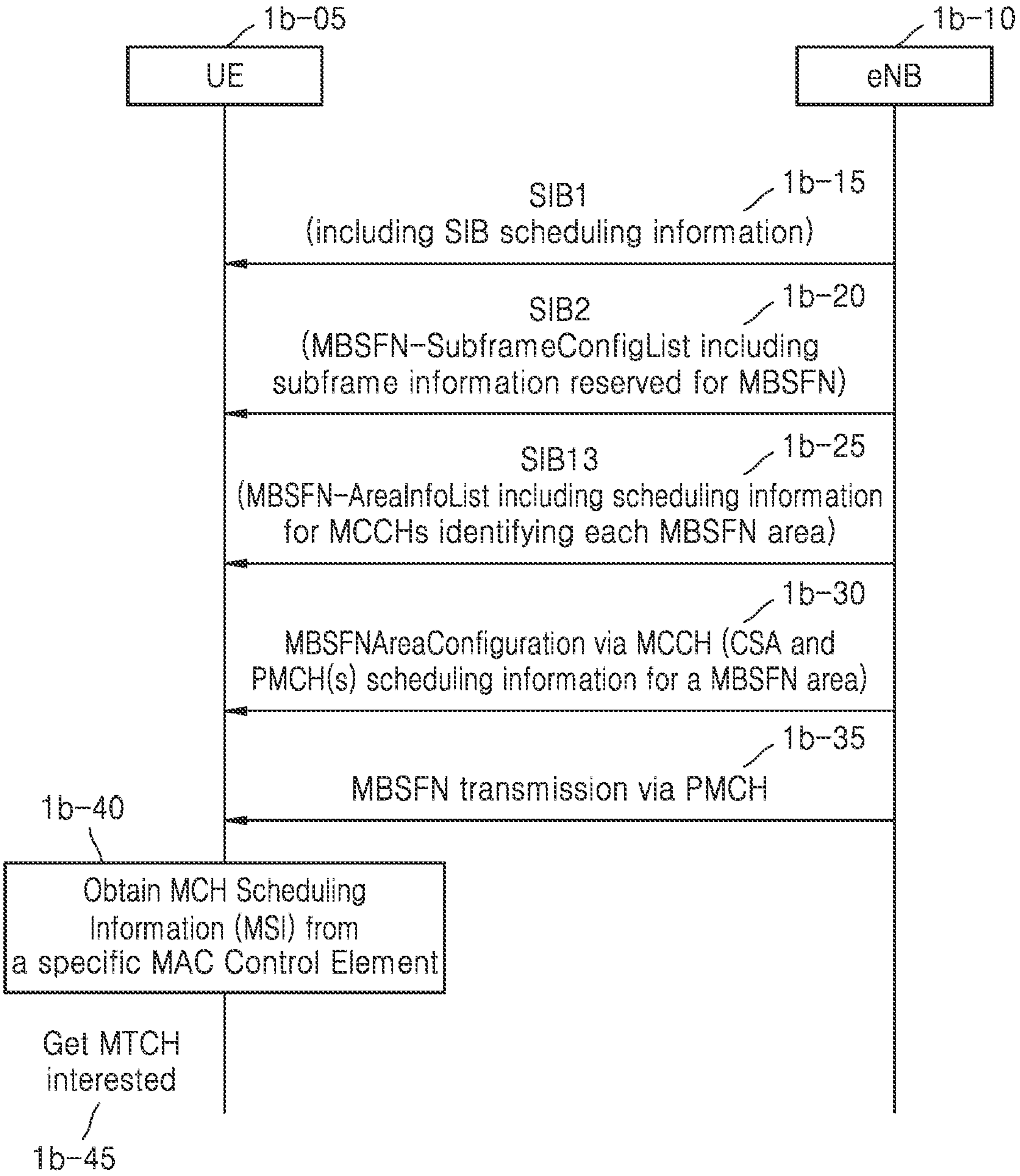
FIG. 1B is a flowchart of a procedure for providing a multimedia broadcast multicast service (MBMS) in a long term evolution (LTE) system according to an embodiment of the present disclosure.

FIG. 1B is a flowchart of a procedure for providing a multimedia broadcast multicast service (MBMS) in an LTE system according to an embodiment of the present disclosure.

The LTE MBMS refers to a technology for providing a broadcast service to UEs in a standby mode (radio resource control (RRC)_IDLE) or a connected mode (RRC_CONNECTED). An MBMS service area indicates a network area including a plurality of BSs capable of performing multimedia broadcast multicast service single frequency network (MBSFN) transmission. An MBSFN area refers to a network area including a plurality of cells integrated for the MBSFN transmission, and cells in the MBSFN area may be synchronized for the MBSFN transmission. All cells except for MBSFN area reserved cells may be used for the MBSFN transmission. An MBSFN area reserved cell is a cell that is not used for the MBSFN transmission and is enabled for transmission for another purpose but is allowed for limited transmit power with respect to a radio resource allocated for the MBSFN transmission.

In operation 1*b*-15, a UE 1*b*-05 receives a system information block (SIB)1 from an eNB 1*b*-10. The SIB1 may include scheduling information for other SIBs. Therefore, in order to receive other SIB, the SIB1 may be priorly received.

In operation **1*b*-20, the UE 1*b*-05 may receive SIB2 from the eNB 1*b*-10**. MBSFN-SubframeConfigList IE of the SIB2 may indicate subframes available for MBSFN transmission. MBSFN-SubframeConfigList IE may include MBSFN-SubframeConfig IE and may indicate which subframe of which radio frame can be an MBSFN subframe. [Table 1] below shows configuration of MBSFN-SubframeConfig IE.

TABLE 1

MBSFN-SubframeConfig information element

```
-- ASN1START
MBSFN-SubframeConfig ::=        SEQUENCE {
   radioframeAllocationPeriod      ENUMERATED {n1, n2, n4, n8, n16, n32},
   radioframeAllocationOffset      INTEGER (0..7),
   subframeAllocation                 CHOICE {
      oneFrame                           BIT STRING (SIZE(6)),
      fourFrames                         BIT STRING (SIZE(24))
   }
}
-- ASN1STOP
```

Here, radioFrameAllocationPeriod and radioFrameAllocationOffset may be used to indicate a radio frame having an MBSFN subframe, and a radio frame satisfying Equation of SFN mod radioFrameAllocationPeriod=radioFrameAllocationOffset may have an MBSFN subframe.

An SFN denotes a system frame number and indicates a radio frame number. The SFN may be repeated in the range of 0 to 1023. SubframeAllocation may indicate which subframe is an MBSFN subframe in a radio subframe indicated by Equation above. The MBSFN subframe may be indicated in a unit of one radio frame or four radio frames. When the unit of one radio frame is used, an MBSFN subframe may be indicated by oneFrame IE. For example, the MBSFN subframe may exist in $1^{st}$, $2^{nd}$, $3^{rd}$, $6^{th}$, $7^{th}$, and $8^{th}$ subframes among a total of 10 subframes in one radio frame. Therefore, oneFrame IE may indicate the MBSFN subframe among the above-listed subframes by using 6 bits. When the unit of four radio frames is used, fourFrames IE may indicate it. fourFrames IE indicates an MBSFN subframe among the above-listed subframes at every radio frame by using a total of 24 bits to cover four radio frames. Therefore, the UE may correctly recognize a subframe available for an MBSFN subframe, by using MBSFN-SubframeConfigList IE.

In operation **1*b*-25, if the UE 1*b*-05 attempts to receive an MBSFN, the UE 1*b*-05 may receive SIB13 from the eNB 1*b*-10**. MBSFN-AreaInfoList IE of SIB13 may include location information of a location where a multicast control channel (MCCH) provided by a cell for each MBSFN area is transmitted.

In operation **1*b*-30, the UE 1*b*-05 may receive an MCCH by using the location information. [Table 2] is associated with MBSFN-AreaInfoList IE. An MCCH corresponding to each MBSFN area is present, and MBDFN-AreaInfoList IE may include MCCH scheduling information of all MBSFN areas. MBSFN-AreaInfo IE may include MCCH scheduling and other information. Mbsfn-AreaId denotes MBSFN area ID. Non-MBSFNregionLength indicates the number of symbols corresponding to a non-MBSFN area among symbols in an MBFSN subframe. The symbol may be located at the start of a subframe. notificationIndicator may be used to indicate a physical downlink control channel (PDCCH) bit notifying the UE 1*b*-05** of a change in MCCH information. Mcch-Config IE may include MCCH scheduling information. Mcch-RepetitionPeriod and mcch-Offset may be used to indicate a location of a frame including an MCCH. Mcch-ModificationPeriod may indicate a transmission period of an MCCH, and sf-AllocInfo may indicate a location of a subframe including the MCCH in a frame including the MCCH. signallingMCS may indicate a modulation and coding scheme (MCS) applied to the subframe indicated by sf-AllocInfo and (P)MCH.

TABLE 2

MBSFN-AreaInfoList information element

```
-- ASN1START
MBSFN-AreaInfoList-r9 ::=            SEQUENCE (SIZE(1..maxMBSFN-Area)) OF MBSFN-AreaInfo-r9
MBSFN-AreaInfo-r9 ::=                SEQUENCE {
   mbsfn-AreaId-r9                          INTEGER (0..255),
   non-MBSFNregionLength                ENUMERATED {s1, s2},
   notificationIndicator-r9                INTEGER (0..7),
   mcch-Config-r9                          SEQUENCE {
      mcch-RepetitionPeriod-r9            ENUMERATED {rf32, rf64, rf128, rf256},
      mcch-Offset-r9                          INTEGER (0..10),
      mcch-ModificationPeriod-r9         ENUMERATED {rf512, rf1024},
      st-AllocInfo-r9                            BIT STRING (SIZE(6)),
      signallingMCS-r9                        ENUMERATED {n2, n7, n13, n19}
   },
   ...
}
```

MBSFNAreaConfiguration IE of an MCCH may indicate a location of a resource to be used for MBSFN transmission. In operation 1*b*-35, the UE 1*b*-05 may receive an MBSFN subframe by using MBSFNAreaConfiguration IE. commonSF-Alloc may indicate a subframe allocated to an MBSFN area. commonSF-AllocPeriod refers to a period in which subframes indicated by commonSF-Alloc are repeated. Pmch-InfoList IE may include all PMCH configuration information of one MBSFN area.

TABLE 3

MBSFNAreaConfiguration message

```
-- ASN1START
MBSFNAreaConfiguration-r9 ::=        SEQUENCE {
    commonSF-Alloc-r9                         CommonSF-AllocPatternList-r9,
    commonSF-AllocPeriod-r9                   ENUMERATED {
                                                                   rf4, rf8, rf16, rf32,
rf64, rf128, rf256},
    pmch-InfoList-r9                          PMCH-InfoList-r9,
    nonCriticalExtension                   MBSFNAreaConfiguration-v930-IEs
    OPTIONAL
}
MBSFNAreaConfiguration-v930-IEs ::=  SEQUENCE {
    lateNonCriticalExtension               OCTET STRING
    OPTIONAL, -- Need OP
    nonCriticalExtension                   SEQUENCE { }
    OPTIONAL -- Need OP
}
CommonSE-AllocPatternList-r9 ::=     SEQUENCE (SIZE (1..maxMBSFN-Allocations)) OF MBSFN-SubframeConfig
-- ASN1STOP
```

In operation 1*b*-40, the UE 1*b*-05 obtains, from multicast channel (MCH) scheduling information medium access control (MAC) control element (CE), a location of an MBSFN subframe on which a desired multicast traffic channel (MTCH) is transmitted, wherein the MCH scheduling information MAC CE is one of MAC CEs of a received MAC protocol data unit (PDU). In operation 1*b*-45, the UE 1*b*-05 may decode the desired MTCH by using MCH scheduling information.

Figure 1C:
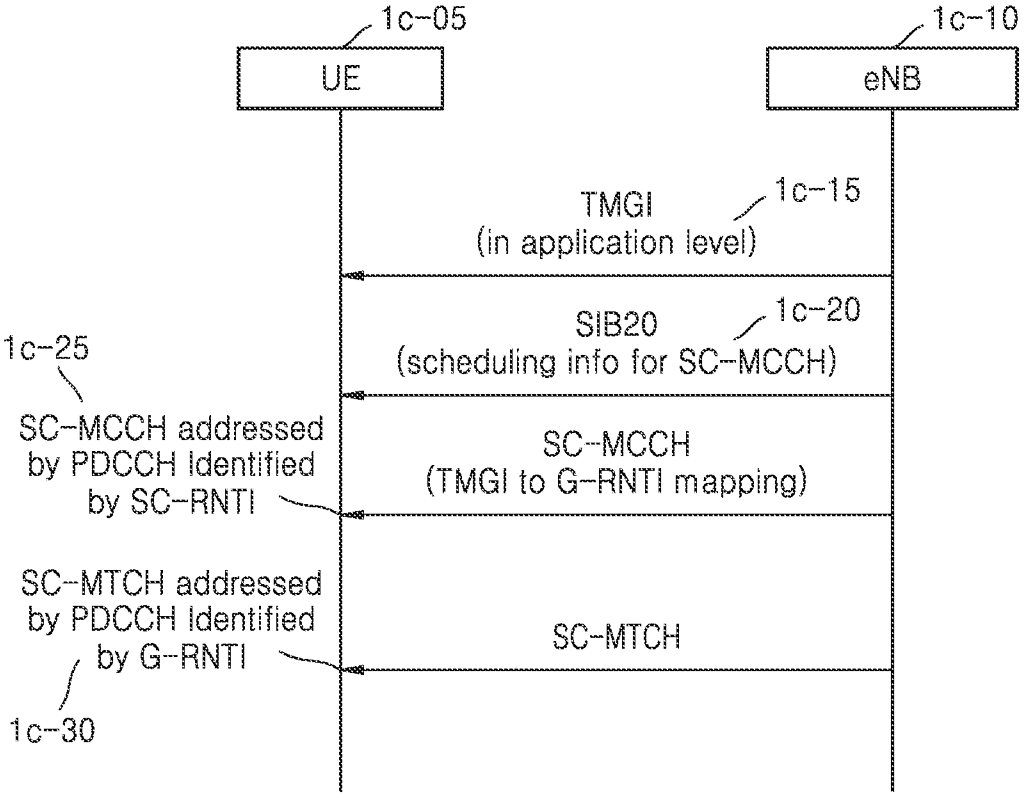
FIG. 1C is a flowchart of a procedure for providing a single cell-point-to-multipoint (SC-PTM) service in an LTE system according to an embodiment of the present disclosure.

FIG. 1C is a flowchart of a procedure for providing a single cell-point-to-multipoint (SC-PTM) service in an LTE system according to an embodiment of the present disclosure.

The LTE MBMS aims to provide a broadcast service to a plurality of users in an MBSFN area including multiple cells. The broadcast service may be provided to a plurality of users by using an MBSFN subframe allocated in a static or semi-static manner within a cell. The LTE MBMS is characterized in that it can provide same contents to a plurality of users. Separately, in the Rel-13 LTE standard, an SC-PTM technology is developed. The SC-PTM technology is designed to facilitate a group call for a commercial purpose or a disaster relief purpose in a service area of a single cell. Also, even in a situation where connection is not established with an external backhaul network, a group call may be facilitated within one cell. Scheduling information is provided to a plurality of UEs participating in a group call, and it is highly efficient to apply the scheduling information to the group call for which transmission and reception data irregularly occur.

In operation 1*c*-15, an eNB 1*c*-10 may provide temporary mobile group identity (TMGI) information to a UE 1*c*-05. The TMGI information may include a public land mobile network (PLMN) ID and a service ID, and may indicate an MBMS service ID.

The UE 1*c*-05 may have TMGI of interest. For example, a police officer may have a TMGI for the purpose of security. In operation 1*c*-20, when the UE 1*c*-05 attempts to perform a group call associated with a TMGI, the UE 1*c*-05 may receive SIB20 broadcast by the eNB 1*c*-10. SIB20 may include scheduling information and single cell-radio network temporary identifier (SC-RNTI) necessary for receiving an SC-MCCH that is a control channel.

In operation 1*c*-25, the UE 1*c*-05 may receive the SC-MCCH, which is indicated by the SC-RNTI, on a PDCCH indicated by the obtained scheduling information. The SC-MCCH may include mapping information with respect to the TMGI and a group-radio network temporary identifier (G-RNTI). In operation 1*c*-30, the UE 1*c*-05 may receive an SC-MTCH indicated by a G-RNTI corresponding to a TMGI of interest.

Figure 1D:
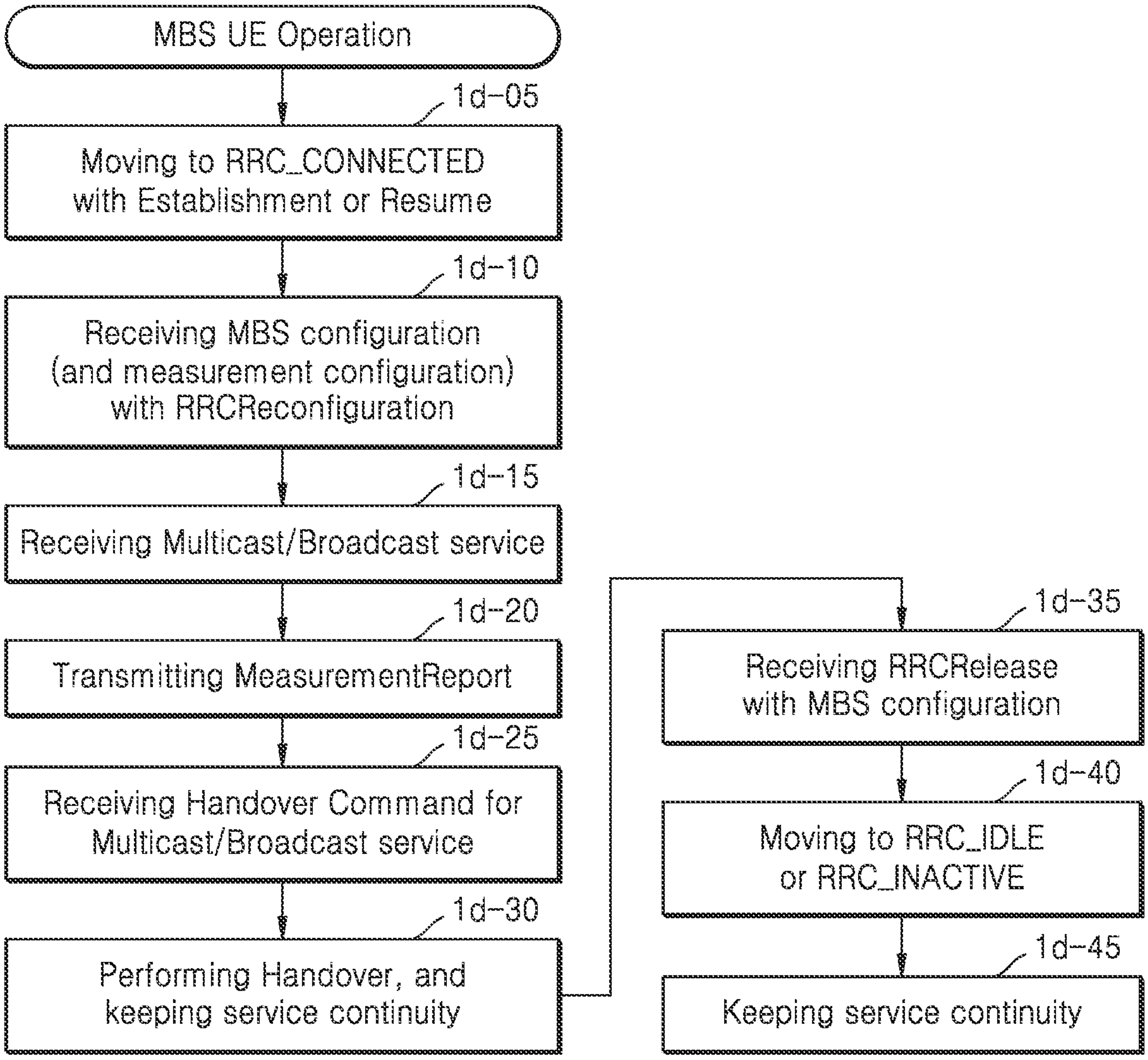
FIG. 1D is a flowchart of a procedure for providing a broadcast service according to an embodiment of the present disclosure.

FIG. 1D is a flowchart of a procedure for providing a broadcast service according to an embodiment of the present disclosure.

The LTE MBMS is appropriate to provide a broadcast service to a plurality of users by using an MBSFN subframe allocated in a static or semi-static manner within a cell. Therefore, such scheduling scheme has a limit in dynamically allocating a radio resource. On the other hand, a SC-PTM uses an efficient scheduling scheme similar to a connected mode but is optimized for a group call in a limited area and thus is inefficient in supporting a group call among scattered users in a wide area.

According to an embodiment of the present disclosure, with respect to provision of a multicast and broadcast services (MBS), MBS-associated configuration may be performed in a connected mode of a UE. Also, in order to support continuity of the MBS, serving cell switching in a handover scheme is proposed. Also, provided is a scheme of continuing an ongoing MBS when a UE switches from a connected mode to an idle mode or an inactive mode.

A flowchart of operations of a UE to be provided an MBS is as below.

In operation 1*d*-05, a UE in an idle mode or inactive mode may switch to a connected mode to receive a preset MBS via an establishment or resume procedure.

In operation 1*d*-10, the UE having switched to the connected mode to receive the MBS may be provided MBS configuration information from a BS. Also, the UE may receive cell measurement configuration information from the BS. The MBS configuration information may be received along with RRC reconfiguration information.

In operation 1*d*-15, the UE may be provided an MBS with respect to a TMGI of interest, based on the provided MBS configuration information.

In operation 1*d*-20, the UE may report a report of collected measurements to the BS, based on the provided cell measurement configuration information.

In operation 1*d*-25, the UE may receive, from the BS, a handover command with respect to the MBS.

In operation 1*d*-30, the UE may perform a handover and may maintain MBS reception from a source cell until a preset point of time. For example, the preset point of time may be a point of time at which a handover to a target cell is regarded as successful.

In operation 1*d*-35, the UE to receive the MBS from the target cell may receive an RRCRelease message including MBS configuration information from the target cell.

In operation 1*d*-40, the UE may switch to an idle mode or an inactive mode, based on the RRCRelease message being received.

In operation 1*d*-45, the UE may maintain MBS reception even in the idle mode or the inactive mode, according to the MBS configuration information.

Figure 1E:
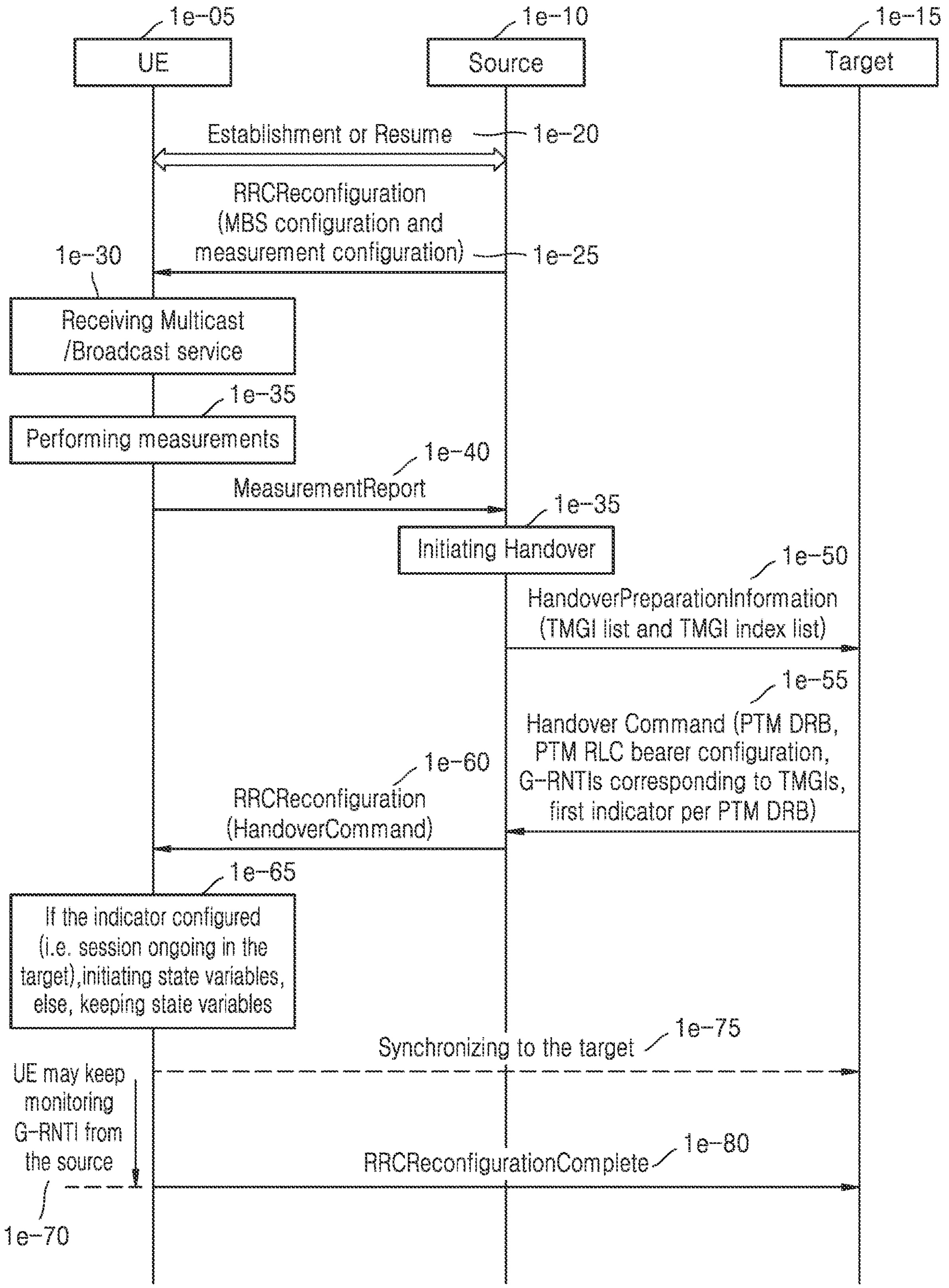
FIG. 1E is a flowchart of a procedure for supporting continuity of a broadcast service in a connected mode according to an embodiment of the present disclosure.

FIG. 1E is a flowchart of a procedure for supporting continuity of a broadcast service in a connected mode according to an embodiment of the present disclosure.

In operation 1*e*-20, a UE 1*e*-05 in an idle mode or an inactive mode may switch to a connected mode via an establishment or resume procedure so as to receive a preset MBS. In the procedure, the UE 1*e*-05 may report, to a source BS 1*e*-10, an indicator indicating MBS information the UE attempts to receive. If the source BS 1*e*-10 cannot support it, the source BS 1*e*-10 may end the establishment or resume procedure via an RRCReject message.

In operation 1*e*-25, the UE 1*e*-05 having switched to the connected mode to receive the MBS may receive, from the source BS 1*e*-10, an RRCReconfiguration message including MBS configuration information. The RRCReconfiguration message may include configuration information about signaling radio bearer 2 (SRB2), data radio bearer (DRB), and MBS DRB. Here, the MBS DRB indicates a data radio bearer to deliver MBS data. The UE 1*e*-05 may need not only the MBS but also need a unicast service, and here, DRB configuration information may also be provided. After the UE 1*e*-05 receives the MBS DRB configuration information, the UE 1*e*-05 may initiate state variables of a packet data convergence protocol (PDCP) of an SRB and a PDCP of a normal DRB as below.

RX_NEXT=0

RX_DELIV=0

In consideration of a case of participation in an ongoing MBS session, a state variable of a PDCP of the MBS DRB may be initiated as below.

- UE sets the initial RCVD_HFN to the fixed value (for example, fixed value=1)
- UE sets the initial RX_NEXT according to the first received PDCP SN and initial RCVD_HFN (RX_NEXT=RCVD_HFN+rcvd PDCP SN+1)
- UE sets the initial RX_DELIV according to the first received PDCP SN and initial RCVD_HFN (RX_DELIV=RCVD_HFN+rcvd PDCP SN)

A state variable of a radio link control (RLC) that serves an SRB, a normal DRB, and a PTM DRB may be initiated as below.

RX_NEXT=0

RX_NEXT_Highest=0

Also, the UE 1*e*-05 may be provided cell measurement configuration information from the source BS 1*e*-10 via an RRCReconfiguration message.

In operation 1*e*-30, the UE 1*e*-05 may be provided an MBS with respect to a TMGI of interest, based on the provided MBS configuration information. The UE 1*e*-05 may monitor configured G-RNTI and C-RNTI (cell-RNTI) on a scheduled PDCCH. If the UE 1*e*-05 receives a transport block (TB) indicated by the G-RNTI, the UE 1*e*-05 may determine an MBS RLC-bearer to deliver a MAC service data unit (SDU), in consideration of a logical channel ID (LCID) of the MAC SDU included in a MAC PDU and the G-RNTI of the MAC PDU. If the UE 1*e*-05 receives a TB indicated by the C-RNTI, the UE 1*e*-05 may determine a point to point (PTP) (unicast) RLC-bearer to deliver a MAC SDU, in consideration of an LCID of the MAC SDU.

In operation 1*e*-35, the UE 1*e*-05 may perform measurement, based on the provided cell measurement configuration information. In operation 1*e*-40, the UE 1*e*-05 may report a result of the measurement to the source BS 1*e*-10.

In operation 1*e*-45, the source BS 1*e*-10 having received the report of the result of the measurement may determine a handover, based on the report.

In operation 1*e*-50, the source BS 1*e*-10 may transmit a HandoverPreparationInformation message to a target BS 1*e*-15. The HandoverPreparationInformation message may include a TMGI list of MBS the UE 1*e*-05 is receiving, and a TMGI index list. A TMGI index is an index value corresponding to a TMGI of MBS the source BS 1*e*-10 is servicing. As a TMGI value consists of several bits, it is inefficient to transmit or receive the TMGI value. Therefore, it is efficient to use an index value corresponding to one TMGI. For example, the source BS 1*e*-10 may provide the UE 1*e*-05 with a TMGI list the source BS 1*e*-10 serves, and a TMGI index list corresponding to each TMGI. The UE 1*e*-05 may report, to the source BS 1*e*-10, a TMGI index value, instead of TMGI, so as to notify the source BS 1*e*-10 of a TMGI preferred by the UE 1*e*-05.

In operation 1*e*-55, when the target BS 1*e*-15 receives the HandoverPreparationInformation message, the target BS 1*e*-15 may transmit a handover command to the source BS 1*e*-10.

The Handover Command may include MBS RLC-bearer configuration information and MBS DRB configuration information of the target BS 1*e*-15. The MBS DRB or MBS RLC-bearer may include information (e.g., TMGI index)) indicating which MBS service is associated with a bearer corresponding thereto.

The target BS 1*e*-15 may not determine a TMGI index by using its SIB but may determine a TMGI index mapped to a bearer, based on a TMGI list and TMGI index list transmitted by the source BS 1*e*-10.

In operation 1*e*-60, the UE 1*e*-05 may receive, from the source BS 1*e*-10, an RRCReconfiguration message including a handover command with respect to the MBS. The RRCReconfiguration message may include information as below.

- MBS DRB configuration information and MBS RLC-bearer configuration information of target BS, and first indicators respectively corresponding to MBS DRBs
- (PTP) DRB configuration information and (PTP) RLC-bearer configuration information of target BS, and first indicators respectively corresponding to PTP DRBs In operation 1*e*-65, the UE 1*e*-05 may perform a handover, and may perform operations below according to the first indicator.

When a first indicator is configured, for an MBS bearer, the UE 1*e*-05 may process data stored in a reordering buffer and may deliver the data to a higher layer. The operation may be performed when the handover is completed or after a first PDCP PDU is received from the target BS 1*e*-15. Also, a state variable may be initialized as below.

- UE sets the initial RCVD_HFN to the fixed value (for example, fixed value=1)
- UE sets the initial RX_NEXT according to the first received PDCP SN from the target node and initial RCVD_HFN (RX_NEXT=RCVD_HFN+rcvd PDCP SN+1)
- UE sets the initial RX_DELIV according to the first received PDCP SN from the target node and initial RCVD_HFN (RX_DELIV=RCVD_HFN+rcvd PDCP SN)

The UE 1*e*-05 may receive a PDCP PDU from the source BS 1*e*-10 even after the UE 1*e*-05 receives the handover command, but they do not have an effect on RX_NEXT and RX_DELIV. Alternatively, initialization of RX_NEXT and RX_DELIV may be performed when the handover is completed or after the first PDCP PDU is received from the target BS 1*e*-15.

When a first indicator is configured, for a PTP bearer, the UE 1*e*-05 may process data stored in a reordering buffer and may deliver the data to a higher layer. Also, a state variable and RX_NEXT may each be initialized to 0, and RX_DELIV may be initialized to 0. The operation may be performed immediately after the handover command is received.

When the first indicator is not configured, a MBS DRB and a PTP DRB may maintain stored PDCP PDUs and may maintain a state variable.

In operation 1*e*-70, the UE 1*e*-05 may maintain MBS reception from the source cell 1*e*-10 up to a preset point of time. For example, the preset point of time may correspond to a point of time at which a handover to the target cell 1*e*-15 is regarded as successful (in other words, a point of time at which an RRCReconfigurationComplete message is regarded as being successfully transmitted to the target cell). That is, until the handover is completed, the UE 1*e*-05 may monitor a G-RNTI from the source BS 1*e*-10 and may monitor a C-RNTI from the target BS.

In operation 1*e*-75, the UE 1*e*-05 having received the handover command may perform a random access procedure on the target BS 1*e*-15.

In operation 1*e*-80, the UE 1*e*-05 may transmit an RRCReconfigurationComplete message to the target cell 1*e*-15. When the RRCReconfigurationComplete message is successfully transmitted, the handover procedure is regarded as successfully completed. In this regard, the UE 1*e*-05 may monitor a G-RNTI and a C-RNTI from the target BS 1*e*-15.

Figure 1F:
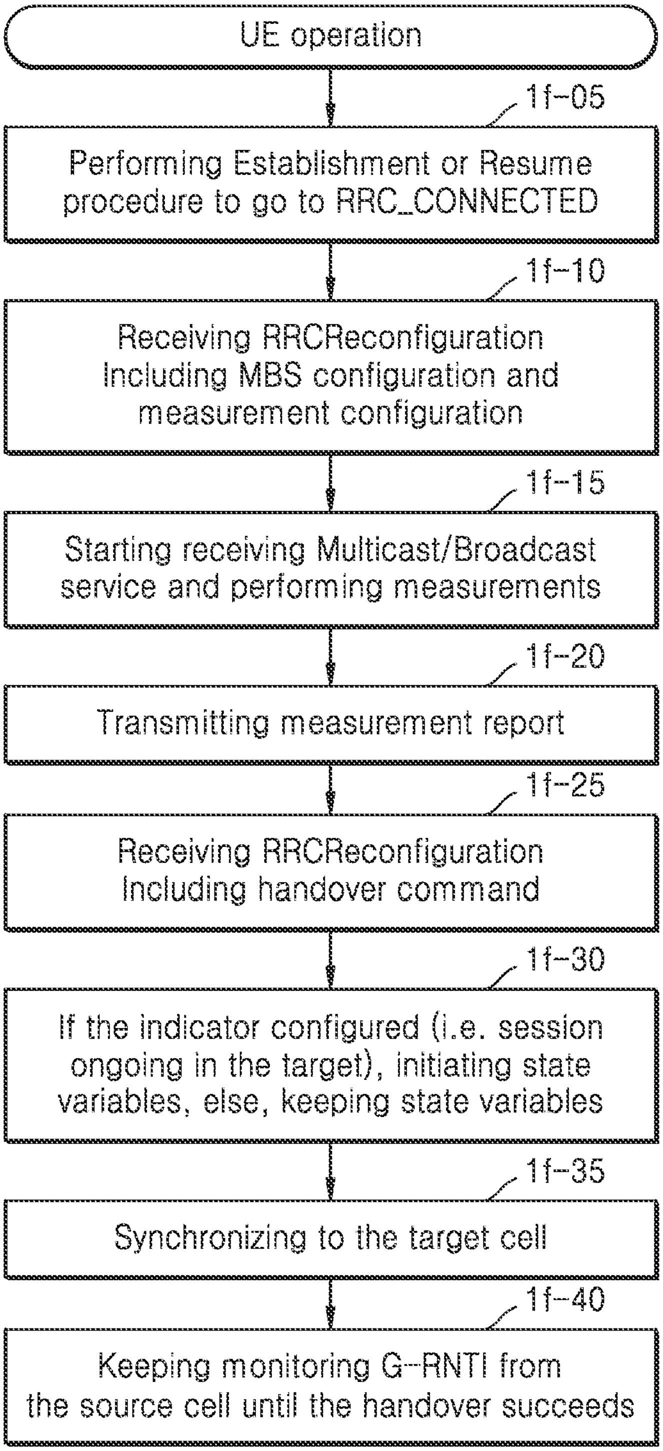
FIG. 1F is a flowchart of user equipment (UE) operations of supporting continuity of a broadcast service in a connected mode according to an embodiment of the present disclosure.

FIG. 1F is a flowchart of UE operations of supporting continuity of a broadcast service in a connected mode according to an embodiment of the present disclosure.

In operation 1*f*-05, a UE in an idle mode or an inactive mode may switch to a connected mode via an establishment or resume procedure to receive a preset MBS.

In operation 1*f*-10, the UE may receive, from the BS, an RRCReconfiguration message including MBS configuration information and cell measurement configuration information.

In operation 1*f*-15, the UE may receive an MBS and may perform a cell measurement operation.

In operation 1*f*-20, the UE may report a result of the measured cell measurement to the BS.

In operation 1*f*-25, the UE may receive, from the BS, an RRCReconfiguration message including a handover command.

In operation 1*f*-30, the UE may initialize preset state variables with respect to an MBS bearer for which a first indicator is configured in the RRCReconfiguration.

In operation 1*f*-35, the UE may perform a random access procedure with respect to a target BS. Until a handover to the target BS is successfully completed, the UE may maintain MBS reception from the source BS.

In operation 1*f*-40, after the handover is completed, the UE may receive the MBS from the target BS.

Figure 1G:
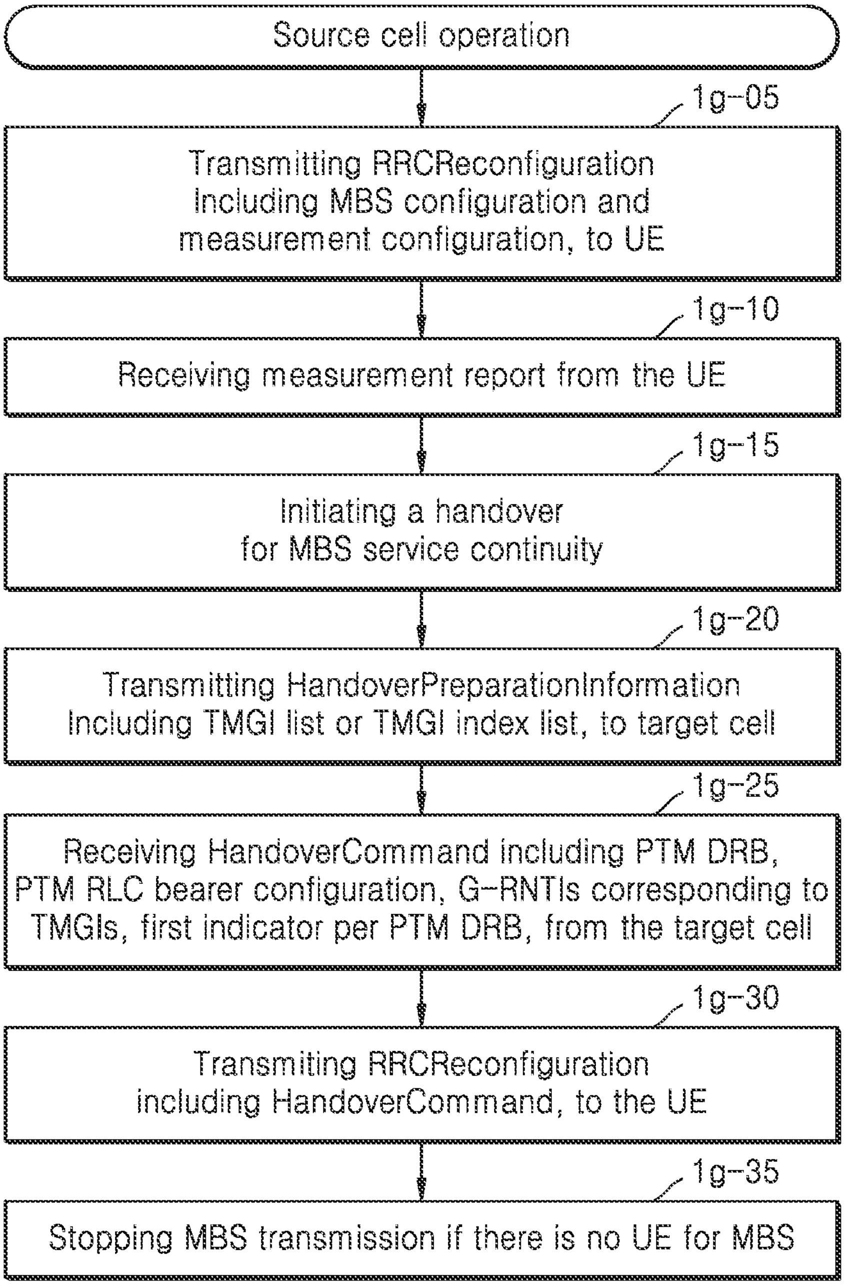
FIG. 1G is a flowchart of base station (BS) operations of supporting continuity of a broadcast service in a connected mode according to an embodiment of the present disclosure.

FIG. 1G is a flowchart of BS operations of supporting continuity of a broadcast service in a connected mode according to an embodiment of the present disclosure.

In operation 1*g*-05, a source BS may transmit an RRCReconfiguration message including MBS configuration information and cell measurement configuration information to the UE having switched to a connected mode to receive an MBS.

In operation 1*g*-10, the source BS may receive, from the UE, a measurement report of a cell measurement result.

In operation 1*g*-15, the source BS may trigger a handover, based on the cell measurement result.

In operation 1*g*-20, the source BS may transmit, to a target BS, a HandoverPreparationInformation message including a TMGI list and a TMGI index list.

In operation 1*g*-25, the source BS may receive, from the target BS, an RRCReconfiguration message including a handover command.

In operation 1*g*-30, the source BS may transmit the RRCReconfiguration to the UE.

In operation 1*g*-35, if it is determined that there is no UE to receive the MBS in a service area of the source BS, the source BS may stop MBS transmission.

Figure 1H:
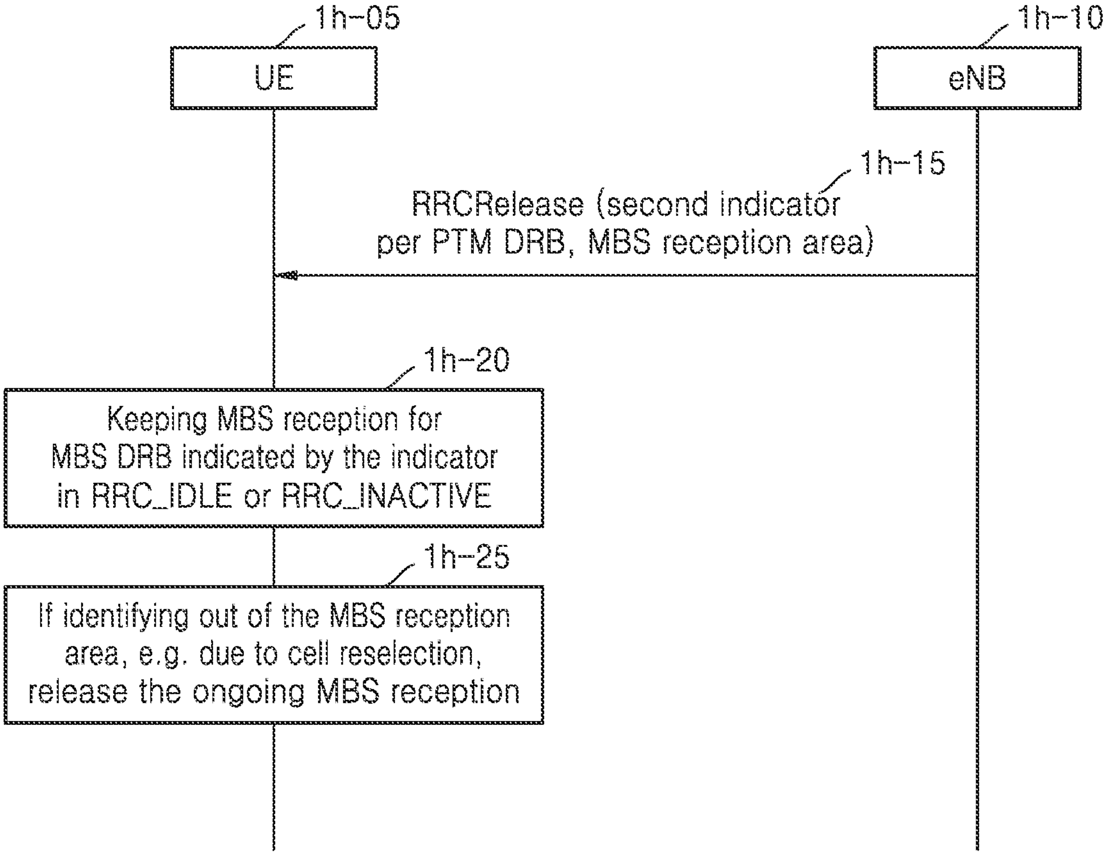
FIG. 1H is a flowchart of a procedure for supporting continuity of a broadcast service in an idle mode or an inactive mode, according to an embodiment of the present disclosure.

FIG. 1H is a flowchart of a procedure for supporting continuity of a broadcast service in an idle mode or an inactive mode, according to an embodiment of the present disclosure.

In operation 1*h*-15, a UE 1*h*-05 may receive, from an eNB 1*h*-10, an RRCRelease message indicating switching to an idle mode or an inactive mode. When the RRCRelease message includes suspend configuration, the UE 1*h*-05 may switch to an inactive mode, and when not including, the UE 1*h*-05 may switch to an idle mode. The RRCRelease message may include a second indicator. The second indicator may be configured for all MBS DRBs or each MBS DRB.

In operation 1*h*-20, when the second indicator is configured, the UE 1*h*-05 may maintain a MBS DRB and receive MBS even after RRC connection release, with respect to ALL MBS DRBS or the MBS DRB corresponding thereto. Also, the RRCRelease message may include list information of a cell or a tracking area (TAs) on which the UE 1*h*-05 can maintain the MBS reception. For example, in a case of a cell list, NR cell global identity (NCGI) or cell identity information, or tracking area code (TAC) information may be used as information about a MBS reception area. If the MBS reception area is not explicitly configured, only a serving cell received the RRCRelease message may belong to the MBS reception area.

When Suspend Config is included in the RRCRelease message, normal PTP DRBs are suspended, and the MBS DRB for which the second indicator is configured is maintained and an MBS DRB otherwise is released.

If Suspend Config is not included in the RRCRelease message, MBS DRBs for which the second indicator is not configured and a DRB are released, and an MBS DRB for which the second indicator is configured is maintained.

The UE **1*h*-05 configured with the second indicator may maintain the MBS reception in an idle mode or an inactive mode. When a current serving cell belongs to the MBS reception area, the UE 1*h*-05** may monitor the MBS DRB for which the second indicator is configured and a G-RNTI corresponding thereto, on a BWP corresponding to the G-RNTI.

The UE **1*h*-05** may receive a TB indicated by the G-RNTI, and may determine an MBS RLC-bearer to which a MAC SDU is to be delivered, in consideration of an LCID of the MAC SDU included in a MAC PDU and a G-RNTI of the MAC PDU.

If the serving cell does not belong to the MBS reception area, the MBS DRB may be released.

Figure 1I:
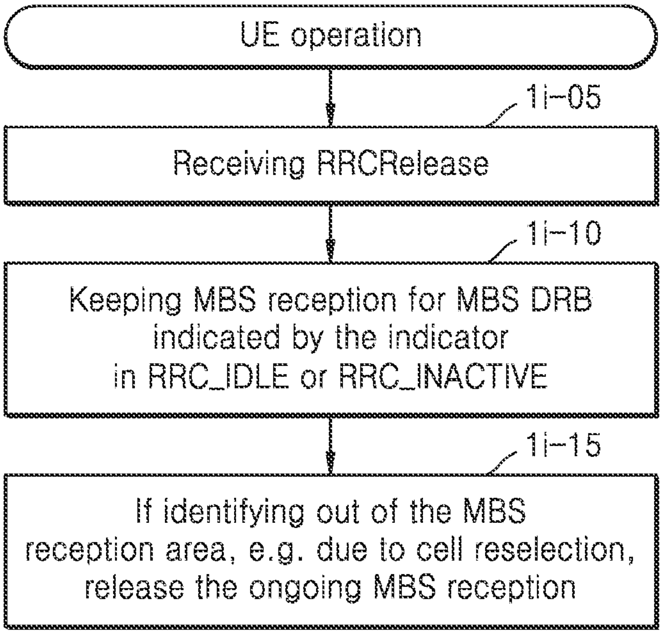
FIG. 1I is a flowchart of UE operations of supporting continuity of a broadcast service in an idle mode or an inactive mode according to an embodiment of the present disclosure.

FIG. 1I is a flowchart of UE operations of supporting continuity of a broadcast service in an idle mode or an inactive mode according to an embodiment of the present disclosure.

In operation **1*i*-05**, a UE may receive an RRCRelease message from a BS.

In operation **1*i*-10**, the UE having switched to an idle mode or an inactive mode according to configuration information included in the Release message may maintain a particular MBS DRB and maintain MBS reception according to configuration.

In operation **1*i*-15**, when a serving cell not belonging to an MBS reception area indicated by the configuration is reselected, the UE may stop the MBS reception and may release an MBS DRB corresponding thereto.

Figure 1J:
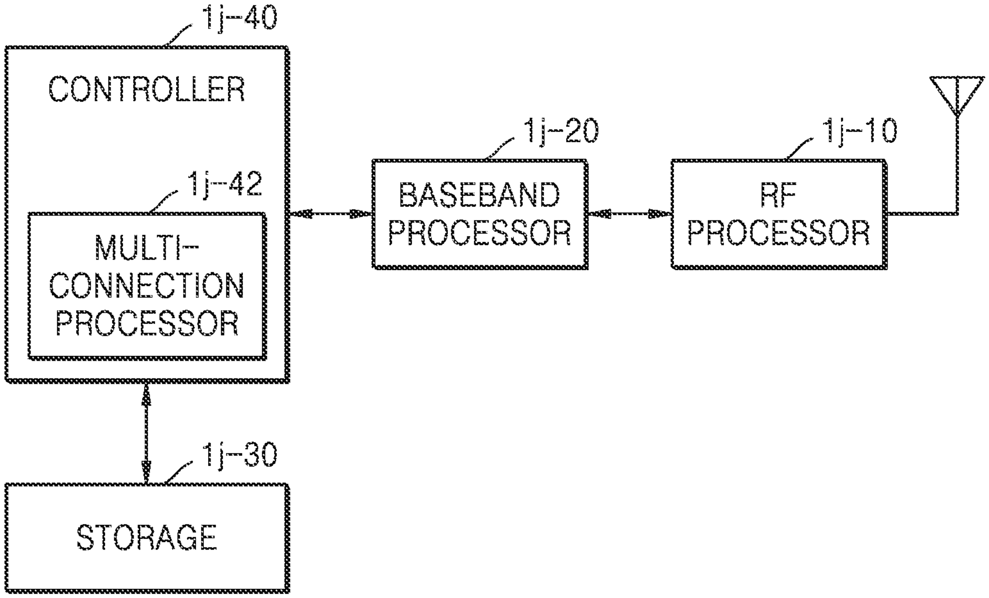
FIG. 1J is a block diagram illustrating an internal structure of a UE according to an embodiment of the present disclosure.

FIG. 1J is a block diagram illustrating an internal structure of a UE according to an embodiment of the present disclosure.

Referring to FIG. 1J, the UE may include a radio frequency (RF) processor **1*j*-10, a baseband processor 1*j*-20, a storage 1*j*-30, and a controller 1*j*-40**.

The RF processor **1*j*-10 performs functions for transmitting and receiving signals through radio channels, e.g., band conversion and amplification of the signals. That is, the RF processor 1*j*-10 may up-convert a baseband signal provided from the baseband processor 1*j*-20, into an RF band signal and then may transmit the RF band signal through an antenna, and may down-convert an RF band signal received through the antenna, into a baseband signal. For example, the RF processor 1*j*-10 may include a transmit filter, a receive filter, an amplifier, a mixer, an oscillator, a digital-to-analog convertor (DAC), an analog-to-digital convertor (ADC), or the like. Although only one antenna is illustrated in drawing, the UE may include a plurality of antennas. Also, the RF processor 1*j*-10 may include a plurality of RF chains. In addition, the RF processor 1*j*-10 may perform beamforming. For beamforming, the RF processor 1*j*-10** may adjust phases and intensities of signals to be transmitted or received through a plurality of antennas or antenna elements. Also, the RF processor may perform a multiple-input and multiple-output (MIMO) operation and may receive a plurality of layers in the MIMO operation.

The baseband processor **1*j*-20 converts between a baseband signal and a bit string according to physical layer specifications of a system. For example, for data transmission, the baseband processor 1*j*-20 may generate complex symbols by encoding and modulating a transmit bit string. For data reception, the baseband processor 1*j*-20 may reconstruct a received bit string by demodulating and decoding a baseband signal provided from the RF processor 1*j*-10. For example, according to an OFDM scheme, for data transmission, the baseband processor 1*j*-20 may generate complex symbols by encoding and modulating a transmit bit string, may map the complex symbols to subcarriers, and then may configure OFDM symbols by performing inverse fast Fourier transform (IFFT) operation and cyclic prefix (CP) insertion. For data reception, the baseband processor 1*j*-20 may segment a baseband signal provided from the RF processor 1*j*-10**, into OFDM symbol units, may reconstruct signals mapped to subcarriers by performing fast Fourier transform (FFT) operation, and then may reconstruct a received bit string by demodulating and decoding the signals.

The baseband processor **1*j*-20 and the RF processor 1*j*-10 transmit and receive signals as described above. Accordingly, the baseband processor 1*j*-20 and the RF processor 1*j*-10 may also be called a transmitter, a receiver, a transceiver, or a communicator. Furthermore, at least one of the baseband processor 1*j*-20 and the RF processor 1*j*-10 may include a plurality of communication modules to support a plurality of different radio access technologies. At least one of the baseband processor 1*j*-20 and the RF processor 1*j*-10** may include different communication modules to process signals of different frequency bands. For example, the different radio access technologies may include a wireless LAN (for example: IEEE 802.11), a cellular network (for example: LTE), or the like. The different frequency bands may include a super high frequency (SHF) (e.g., 2.NRHz, NRhz) band and a millimeter-wave (mmWave) (e.g., 60 GHz) band.

The storage **1*j*-30 stores basic programs, application programs, and data, e.g., configuration information, for operations of the UE. In particular, the storage 1*j*-30 may store information about a second access node that performs wireless communication by using a second radio access technology. The storage 1*j*-30 provides the stored data, based on a request by the controller 1*j*-40**.

The controller **1*j*-40 controls overall operations of the UE. For example, the controller 1*j*-40 transmits and receives signals via the baseband processor 1*j*-20 and the RF processor 1*j*-10. Also, the controller 1*j*-40 records and reads data on or from the storage 1*j*-40. To this end, the controller 1*j*-40 may include at least one processor. For example, the controller 1*j*-40** may include a communication processor (CP) for controlling communications and an application processor (AP) for controlling a higher layer such as an application program.

Figure 1K:
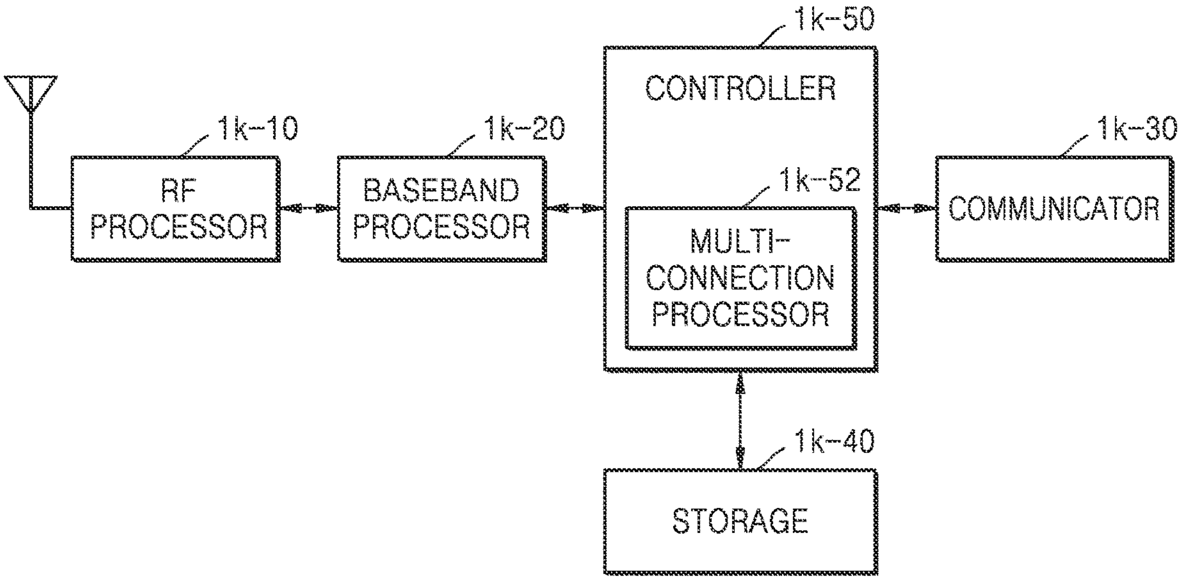
FIG. 1K is a block diagram illustrating a configuration of a BS according to an embodiment of the present disclosure.

FIG. 1K is a block diagram illustrating a configuration of a BS according to an embodiment of the present disclosure.

As illustrated in FIG. 1K, the BS includes a RF processor **1*k*-10, a baseband processor 1*k*-20, a backhaul communicator 1*k*-30, a storage 1*k*-40, and a controller 1*k*-50**.

The RF processor **1*k*-10 performs functions for transmitting and receiving signals through radio channels, e.g., band conversion and amplification of the signals. That is, the RF processor 1*k*-10 may up-convert a baseband signal provided from the baseband processor 1*k*-20, into an RF band signal and then may transmit the RF band signal through an antenna, and may down-convert an RF band signal received through the antenna, into a baseband signal. For example, the RF processor 1*k*-10 may include a transmit filter, a receive filter, an amplifier, a mixer, an oscillator, a DAC, an ADC, or the like. Although only one antenna is illustrated in drawing, a first access node may include a plurality of antennas. Also, the RF processor 1*k*-10 may include a plurality of RF chains. In addition, the RF processor 1*k*-10 may perform beamforming. For beamforming, the RF processor 1*k*-10** may adjust phases and intensities of respective signals to be transmitted or received through a plurality of antennas or antenna elements. The RF processor may perform a DL MIMO operation by transmitting one or more layers.

The baseband processor **1*k*-20 converts between a baseband signal and a bit string according to physical layer specifications of a first radio access technology. For example, for data transmission, the baseband processor 1*k*-20 generates complex symbols by encoding and modulating a transmit bit string. For data reception, the baseband processor 1*k*-20 reconstructs a received bit string by demodulating and decoding a baseband signal provided from the RF processor 1*k*-10. For example, according to an OFDM scheme, for data transmission, the baseband processor 1*k*-20 generates complex symbols by encoding and modulating a transmit bit string, maps the complex symbols to subcarriers, and then configures OFDM symbols by performing IFFT operation and CP insertion. For data reception, the baseband processor 1*k*-20 segments a baseband signal provided from the RF processor 1*k*-10, into OFDM symbol units, reconstructs signals mapped to subcarriers by performing FFT operation, and then reconstructs a received bit string by demodulating and decoding the signals. The baseband processor 1*k*-20 and the RF processor 1*k*-10 transmit and receive signals as described above. Accordingly, the baseband processor 1*k*-20 and the RF processor 1*k*-10** may also be called a transmitter, a receiver, a transceiver, a communicator, or a wireless communicator.

The backhaul communicator **1*k*-30 provides an interface for performing communication with other nodes in a network. That is, the backhaul communicator 1*k*-30** converts a bit string into a physical signal, the bit string being transmitted from a primary BS to another node, e.g., an auxiliary BS, a core network, etc., and converts a physical signal into a bit string, the physical signal being received from the other node.

The storage **1*k*-40 stores basic programs, application programs, and data, e.g., configuration information, for operations of the primary BS. In particular, the storage 1*k*-40 may store information about a bearer allocated to an accessing UE, a measurement result reported from the accessing UE, and the like. Also, the storage 1*k*-40 may store information that is a reference as to whether to provide or stop multi-connection to a UE. The storage 1*k*-40 provides the stored data, based on a request by the controller 1*k*-50**.

The controller **1*k*-50 controls overall operations of the primary BS. For example, the controller 1*k*-50 transmits and receives signals via the baseband processor 1*k*-20 and the RF processor 1*k*-10, or the backhaul communicator 1*k*-30. Also, the controller 1*k*-50 records and reads data on or from the storage 1*k*-40. To this end, the controller 1*k*-50** may include at least one processor.

The methods according to the embodiments of the present disclosure as described in the claims or the specification may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the present disclosure as described in the claims or the specification.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the present disclosure. Furthermore, a separate storage device on the communication network may access the electronic device performing the embodiments of the present disclosure.

In the afore-described embodiments of the present disclosure, configuration elements included in the present disclosure are expressed in a singular or plural form according to the embodiments of the present disclosure. However, the singular or plural form is appropriately selected for convenience of descriptions and the present disclosure is not limited thereto. As such, a configuration element expressed in a plural form may also be configured as a single element, and a configuration element expressed in a singular form may also be configured as plural elements.

Specific embodiments are described in the descriptions of the present disclosure, but it will be understood that various modifications may be made without departing the scope of the present disclosure. Thus, the scope of the present disclosure is not limited to the embodiments described herein and should be defined by the appended claims and their equivalents. In other words, it will be apparent to one of ordinary skill in the art that other modifications based on the technical ideas of the present disclosure are feasible. Also, the embodiments of the present disclosure may be combined to be implemented, when required. For example, portions of the methods provided by the present disclosure may be combined with each other to enable the BS and the UE to operate. Also, although the embodiments are described based on 5G and NR systems, modifications based on the technical scope of the embodiments may be applied to other communication systems such as LTE, LTE-A, LTE-A-Pro systems, or the like.

The invention claimed is:

1. A method performed by a source base station in a wireless communication system, the method comprising:

transmitting, to a target base station, a handover preparation information message including a list of temporary mobile group identity (TMGI) corresponding to at least one multicast broadcast service (MBS) which a user equipment (UE) is receiving and a list of TMGI indexes, wherein each TMGI index of the list of TMGI indexes is an index value of a TMGI corresponding to an MBS from among the at least one MBS which the UE is receiving;

receiving, from the target base station, a handover command message including MBS data radio bearer (DRB) configuration information and MBS radio link control (RLC) bearer configuration information, wherein the MBS DRB configuration information includes information indicating an association between at least one MBS and at least one bearer based on the list of TMGI and the list of TMGI indexes, and wherein the MBS RLC bearer configuration information includes information indicating association between at least one MBS and at least one RLC bearer based on the list of TMGI and the list of TMGI indexes; and transmitting, to the UE, a radio resource control (RRC) reconfiguration message including the handover command message, wherein the RRC reconfiguration message includes configuration information that causes the UE to set packet data convergence protocol (PDCP) state variables for an MBS DRB based on a first PDCP sequence number received from the target base station and a predefined header field number (HFN).

2. The method of claim 1, wherein information related to the TMGI includes a public land mobile network (PLMN) ID and a service ID.

3. A source base station, performed in a wireless communication system, the source base station comprising:

a transceiver;

memory storing one or more instructions; and at least one processor coupled with the transceiver, wherein the at least one processor is configured to: execute the one or more instructions to cause the source base station to:

transmit, to a target base station, a handover preparation information message including a list of temporary mobile group identity (TMGI) corresponding to at least one multicast broadcast service (MBS) which a user equipment (UE) is receiving and a list of TMGI indexes, wherein each TMGI index of the list of TMGI indexes is an index value of a TMGI corresponding to an MBS from among the at least one MBS which the UE is receiving; and receive, from the target base station, a handover command message including MBS data radio bearer (DRB) configuration information and MBS radio link control (RLC) bearer configuration information, wherein the MBS DRB configuration information includes information indicating an association between at least one MBS and at least one bearer based on the list of TMGI and the list of TMGI indexes, and wherein the MBS RLC bearer configuration information includes information indicating association between at least one MBS and at least one RLC bearer based on the list of TMGI and the list of TMGI indexes; and transmit, to the UE, a radio resource control (RRC) reconfiguration message including the handover command message, wherein the RRC reconfiguration message includes configuration information that causes the UE to set packet data convergence protocol (PDCP) state variables for an MBS DRB based on a first PDCP sequence number received from the target base station and a predefined header field number (HFN).

4. The source base station of claim 3, wherein information related to the TMGI includes a public land mobile network (PLMN) ID and a service ID.

5. A method performed by a target base station in a wireless communication system, the method comprising:

receiving, from a source base station, a handover preparation information message including a list of temporary mobile group identity (TMGI) corresponding to at least one multicast broadcast service (MBS) which a user equipment (UE) is receiving and a list of TMGI indexes, wherein each TMGI index of the list of TMGI indexes is an index value of a TMGI corresponding to an MBS from among the at least one MBS which the UE is receiving; and transmitting, to the source base station, a handover command message including MBS data radio bearer (DRB) configuration information and MBS radio link control (RLC) bearer configuration information, wherein the MBS DRB configuration information includes information indicating an association between at least one MBS and at least one bearer based on the list of TMGI and the list of TMGI indexes, wherein the MBS RLC bearer configuration information includes information indicating association between at least one MBS and at least one RLC bearer based on the list of TMGI and the list of TMGI indexes, and wherein the handover command message further includes configuration information that causes the UE to set packet data convergence protocol (PDCP) state variables for an MBS DRB based on a first PDCP sequence number received from the target base station and a predefined header field number (HFN).

6. The method of claim 5, wherein information related to the TMGI includes a public land mobile network (PLMN) ID and a service ID.

7. A target base station, performed in a wireless communication system, the target base station comprising:

a transceiver;

memory storing one or more instructions; and at least one processor coupled with the transceiver, wherein the at least one processor is configured to: execute the one or more instructions to cause the target base station to:

receive, from a source base station, a handover preparation information message including a list of temporary mobile group identity (TMGI) corresponding to at least one multicast broadcast service (MBS) which a user equipment (UE) is receiving and a list of TMGI indexes, wherein each TMGI index of the list of TMGI indexes is an index value of a TMGI corresponding to an MBS from among the at least one MBS which the UE is receiving, and transmit, to the source base station, a handover command message including MBS data radio bearer (DRB) configuration information and MBS radio link control (RLC) bearer configuration information, wherein the MBS DRB configuration information includes information indicating an association between at least one MBS and at least one bearer based on the list of TMGI and the list of TMGI indexes, wherein the MBS RLC bearer configuration information includes information indicating association between at least one MBS and at least one RLC bearer based on the list of TMGI and the list of TMGI indexes, and wherein the handover command message further includes configuration information that causes the UE to set packet data convergence protocol (PDCP) state variables for an MBS DRB based on a first PDCP sequence number received from the target base station and a predefined header field number (HFN).

8. The target base station of claim 7, wherein information related to the TMGI includes a public land mobile network (PLMN) ID and a service ID.

* * * * *